United States Patent
Shefet et al.

(10) Patent No.: US 6,689,407 B2
(45) Date of Patent: Feb. 10, 2004

(54) ENHANCED CAPACITY FOOD PROCESSING SYSTEMS WITH EFFICIENT SPACE UTILIZATION

(75) Inventors: Sarid M. Shefet, Cary, NC (US); Richard Rodeheaver Hawkins, Raleigh, NC (US)

(73) Assignee: GoodMark Foods, Inc., Garner, NC (US)

(*) Notice: Subject to any disclaimer, the term of this patent is extended or adjusted under 35 U.S.C. 154(b) by 291 days.

(21) Appl. No.: 09/888,925

(22) Filed: Jun. 25, 2001

(65) Prior Publication Data

US 2002/0197363 A1 Dec. 26, 2002

(51) Int. Cl.[7] .............................. A21L 1/31; F24C 15/32; F27B 9/00
(52) U.S. Cl. ............................ 426/315; 34/207; 99/355; 99/386; 99/443 C; 99/479; 122/21 A; 426/465; 426/520; 426/524; 432/133
(58) Field of Search ................ 426/315, 465, 426/513, 520, 523, 524, 646; 99/355, 386, 443 C, 470, 473, 477, 478, 479; 122/21 R, 21 A; 34/207; 432/133

(56) References Cited

U.S. PATENT DOCUMENTS

| | | |
|---|---|---|
| 2,873,020 A | 2/1959 | Kay |
| 4,079,666 A | 3/1978 | Plemons et al. ............... 99/355 |
| 4,565,282 A | 1/1986 | Olsson et al. ................ 198/778 |
| 4,582,047 A | 4/1986 | Williams ..................... 126/369 |
| 4,726,766 A | * 2/1988 | Stewart et al. ............ 99/443 C |
| 4,771,876 A | 9/1988 | Bandixen |
| 4,890,394 A | 1/1990 | Troetscher ........................ 34/1 |
| 4,899,866 A | 2/1990 | Colamussi |
| 4,997,365 A | 3/1991 | Lanham ...................... 432/121 |
| 5,078,120 A | 1/1992 | Hwang ...................... 126/21 A |
| 5,277,301 A | 1/1994 | Fenty .......................... 198/778 |
| RE35,259 E | 6/1996 | Williams ..................... 126/369 |
| 5,843,504 A | * 12/1998 | Kobussen et al. .......... 426/513 |
| 5,942,265 A | 8/1999 | Roberds et al. ............... 426/59 |

FOREIGN PATENT DOCUMENTS

FR    2.088.622    4/1970

* cited by examiner

Primary Examiner—George C. Yeung
(74) Attorney, Agent, or Firm—Myers Bigel Sibley & Sajovec PA

(57) ABSTRACT

Mass production food processing methods, systems, and apparatus with increased capacity over conventional design are configured to direct food to travel serially over side-by-side travel paths so as to travel a plurality of revolutions about a tier or level in a vertically stacked food processing unit before moving to the next tier.

60 Claims, 13 Drawing Sheets

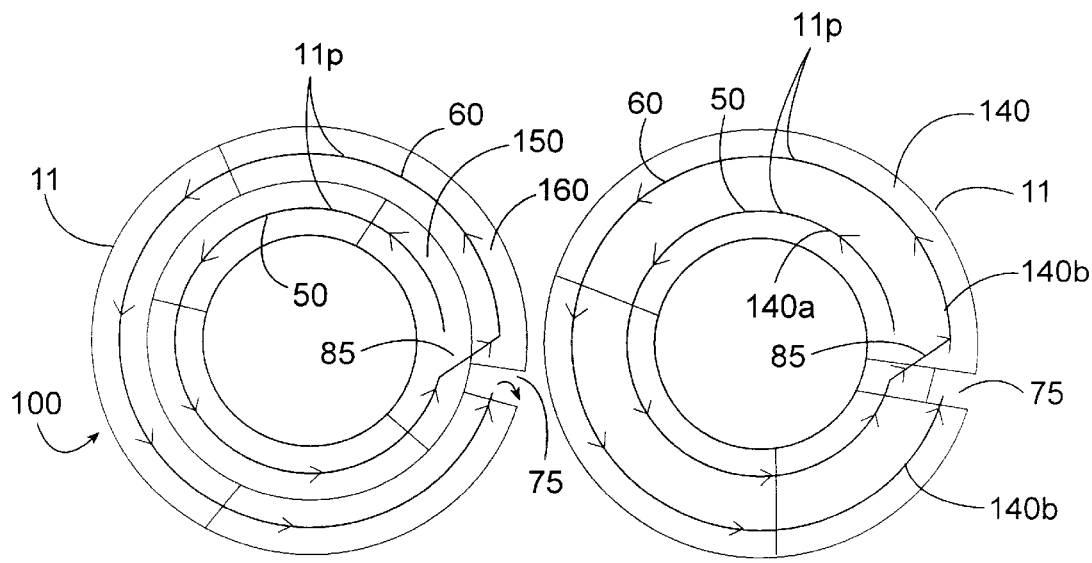
*FIG. 10A.*  *FIG. 10B.*
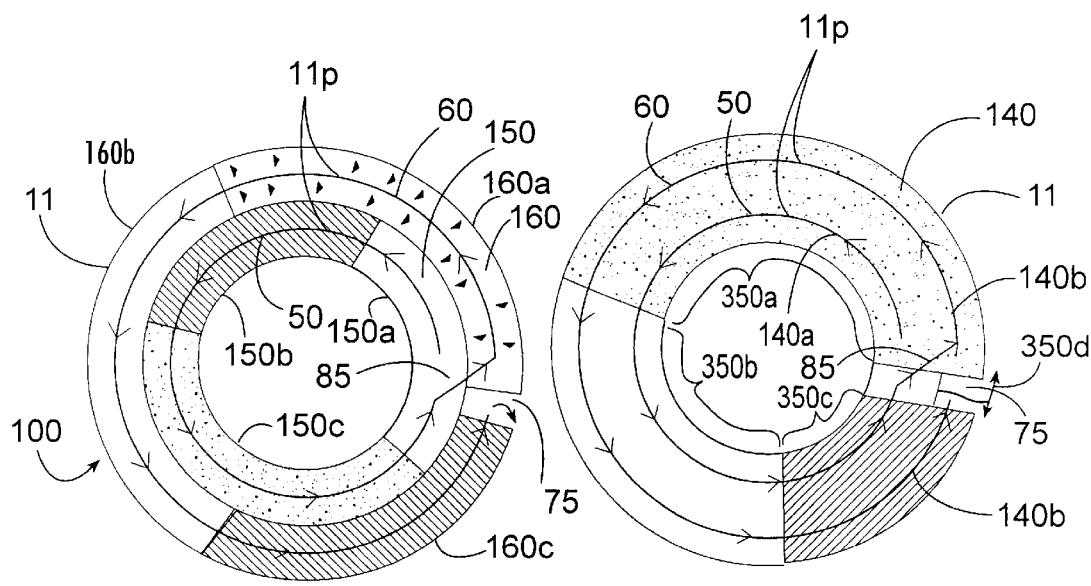
*FIG. 10C.*  *FIG. 10D.*

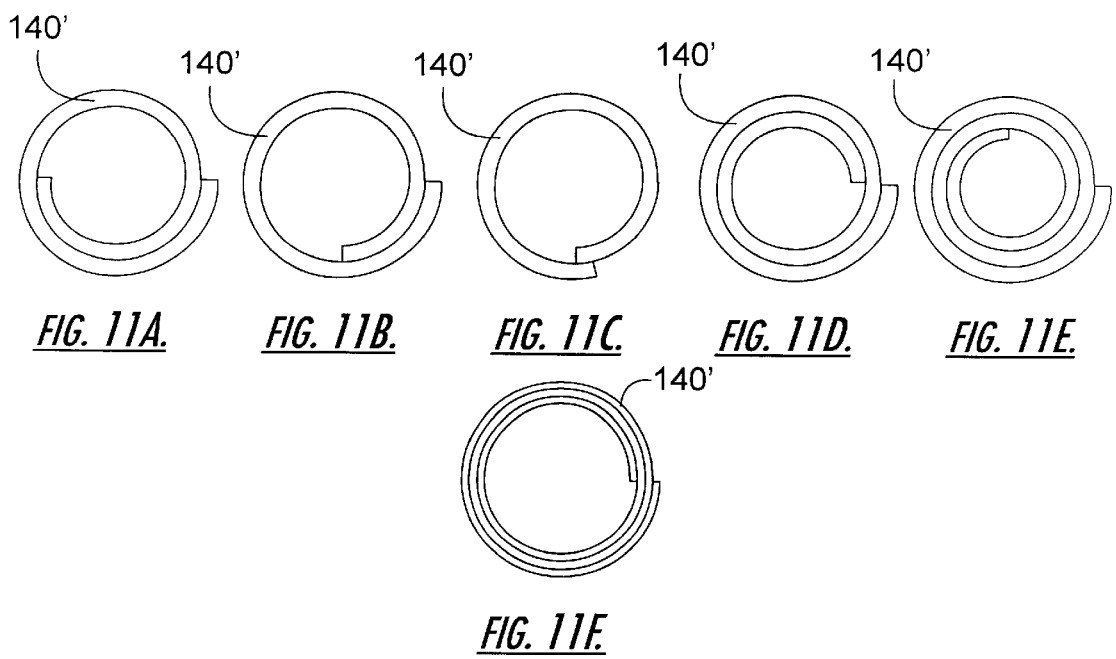

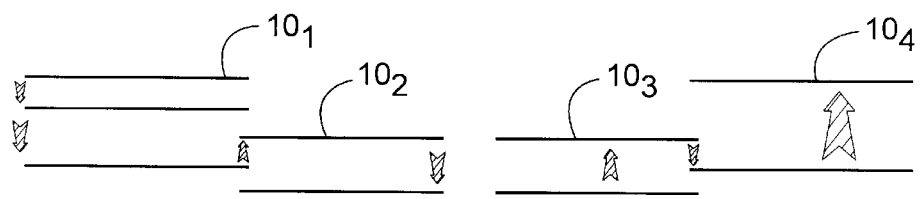
*FIG. 18.*
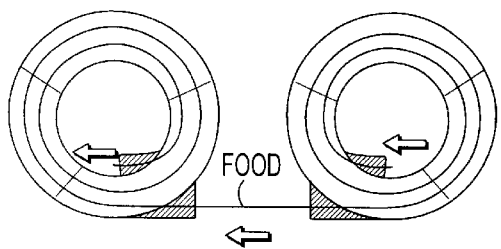 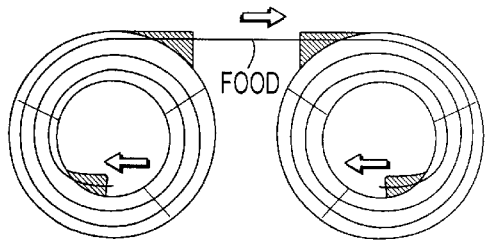
*FIG. 19A.*  *FIG. 19B.*

ENHANCED CAPACITY FOOD PROCESSING SYSTEMS WITH EFFICIENT SPACE UTILIZATION

FIELD OF THE INVENTION

The present invention relates to food treatment systems such as vertical rise dryers, smokers, curing chambers, ovens or warmers, coolers, and freezers.

BACKGROUND OF THE INVENTION

Conventionally, several different food treatment system configurations have been used to smoke, cure, dry, cook, cool, or freeze food products such as meat products so as to increase production capacity while attempting to limit the floor space required for carrying out same. In so doing, vertical rise systems have been used with spiral conveyors to move food vertically through the oven while exposing the food to certain processing conditions as it moves from top to bottom or bottom to top.

For example, the Northfield LST (Large Spiral Technology) freezer available from Frigoscandia Equipment (fmcfoddtech.com) is a high capacity non-self stacking spiral freezer that employs spiral conveyors with belts available in different widths. Ryson International Inc. of Newport News, Va., provides spiral conveyors that allegedly feature a small footprint and space savings over other brands with load capacities of up to 200 fpm.

Another example is the TURBO-Dryer® from Wyssmont (wyssmont.com). The TURBO-Dryer® uses a stack of slowly rotating circular trays. In operation, food is fed onto the top tray and, after one revolution, is wiped onto the next lower tray where the operation is repeated. The trays are enclosed in a vertical enclosure that circulates heated air or gas about the food on the trays. Each level in the enclosure may be held at a uniform temperature or the enclosure may be configured with zoned temperature regions having different temperatures.

Yet another example is found in U.S. Pat. No. 5,942,265 which describes conveying pepperoni meat to a conventional spiral dryer which includes a number of tiers (typically about 38–42) according to the initial moisture level, the desired final moisture level, the relative humidity of the air, the total amount of water to be removed, the temperature, and the conveyor speed.

Nonetheless, there remains a need to provide increased capacity food processing system configurations which limit the amount of dedicated floor space required to support the system in food processing facilities.

SUMMARY OF THE INVENTION

The present invention provides mass production food processing methods, systems, and apparatus with increased capacity over conventional designs. In certain embodiments, the methods, systems and apparatus are configured to direct food to travel serially over side-by-side travel paths so as to travel greater than one, and typically, a plurality of revolutions about a tier or level in a food-processing unit before moving to the next tier. Advantageously, such an arrangement can increase the amount of product that can be concurrently processed and/or reduce the unused volume in vertical rise systems over conventional designs.

In certain embodiments, cooperating side-by-side conveyors on each tier can be configured (such as pairs or more of continuously circulating conveyor belts) so that the food travels first on a first conveyor belt and then moves to an adjacent belt as the food travels greater than one revolution (and typically at least about 1.25–2 revolutions) about a majority of the tiers or levels. In other embodiments, the same conveyor can be used to provide the more than one revolution in each tier (diverting the food into different tracks within the same conveyor) or looping the conveyor to define a greater than one revolution travel path. In certain embodiments, the food item can be physically diverted or dropped to a next adjacent underlying tier for further processing. The food item can be an elongated (preferably a substantially continuous length of food product) reducing the amount of ends which may be discarded or reprocessed.

Certain embodiments of the invention include methods for directing food through a multi-tier food processor. The method includes conveying at least one food item over a predetermined travel path in a food processor having a plurality of overlying or underlying tiers which are longitudinally spaced such that the at least one food item travels greater than one revolution in a first tier before it moves to the next tier (which may be aligned or misaligned as desired).

In certain embodiments, each tier can be configured with a plurality of side-by-side travel perimeter paths thereon. Each of the travel perimeter paths can form a serial portion of the predetermined travel path so as to direct the at least one food item to travel a predetermined distance about a major portion of a first perimeter path and then alter its travel path on the respective tier to travel a predetermined distance about a major portion of a second perimeter path. The second perimeter path can be different than the first (i.e., a different length or shape and is typically located on one of the outside or inside of the other adjacent perimeter path(s)).

Other embodiments are directed to a food processing apparatus. The apparatus can include a housing defining an enclosure and having a food inlet and a food outlet. A plurality of stacked tiers can be posited to reside in the housing. Each of the tiers can be configured with a plurality of side-by-side cooperating continuous conveyors configured to move a food product in a predetermined travel path over a primary surface of a respective tier such that the food product moves in a first perimeter path having a first position and then to a second perimeter path having a second position different from the first position on the tier so as to travel greater than one revolution in each tier.

The apparatus may also include a heating chamber disposed in the housing such that it heats at least one of the tiers. The heating chamber is configured to heat the food product as it moves through the heating chamber on the conveyors. In addition, in certain embodiments, the plurality of side-by-side cooperating continuous conveyors are a cooperating pair of conveyors. Each tier can further comprises a transfer junction operably associated with the conveyor pair which directs the food product from the first conveyor to the second conveyor and a tier transfer region where the food is directed to the next selected tier.

In certain embodiments, in lieu of cooperating conveyors (or with cooperating conveyors) the transfer junction directs the food product to a new position or track within or on the same conveyor, thereby providing more than one revolution in each tier. Of course, combinations of single and cooperating conveyors can be used as desired.

Still other embodiments are directed to a large capacity vertical rise oven. The oven includes a housing with a food inlet and outlet. The housing can be configured and sized to enclose at least one heater and a plurality of stacked tiers therein. The oven can include a plurality of cooperating conveyors operably associated with each tier, the cooperating conveyors being configured to move an elongated food item serially over a major portion of the travel path of each of the cooperating conveyors to thereby provide more than one revolution in each tier. Alternatively, or in addition thereto, a conveyor can be configured with multiple tracks to define the greater than one revolution travel paths.

Another embodiment of the present invention is a multiple nested oven food processing apparatus. The nested oven can include: (a) a vertically extending outer oven having spaced apart inner and outer walls defining an enclosure therebetween and a food inlet and food outlet; and (b) a vertically extending inner oven defining an enclosure and having a food inlet and a food outlet. The outer oven is configured to receive and surround the inner oven. Each of the inner and outer ovens can be configured to provide separate temperature regulated (and moisture or humidity, air velocity, cooling, heating, sprinkling, gas, and the like) spaces. The outer and inner ovens can include a plurality of stacked tiers held within the respective enclosures and one conveyor or a plurality of cooperating conveyors operably associated with each tier. The conveyor or cooperating conveyors can be configured to move the at least one food item serially over a major portion of the travel path to thereby provide more than one revolution in each tier. The ovens can also include transfer means for directing the food to travel to the next selected (typically the adjacent) tier.

The foregoing and other objects and aspects of the present invention are explained in detail in the specification set forth below.

BRIEF DESCRIPTION OF THE DRAWINGS

FIGS. 10A–10B are top views of a tier defined by either a single conveyor track or with one or more adjacent side-by-side or adjacent or serially in-line conveyor tracks according to embodiments of the invention.

FIGS. 10C–10D are top views of a tier defined by serially spaced in line cooperating conveyors according to embodiments of the present invention.

FIGS. 11A–11F illustrate a looped single conveyor track used to define the travel paths of the food item over the tier according to embodiments of the present invention.

FIG. 18 is a side view of using an extended travel path within a single system, the extended travel path being configured to travel between tiers in a dual or multi-oven or processor arrangement according to embodiments of the present invention.

FIGS. 19A–19B are top views illustrating that the system can be configured to direct the food items to travel laterally over two corresponding tiers (within the same tier region vertically) prior to drop or elevation to the next vertical tier according to embodiments of the present invention.

DESCRIPTION OF EMBODIMENTS OF THE INVENTION

Figure 1:
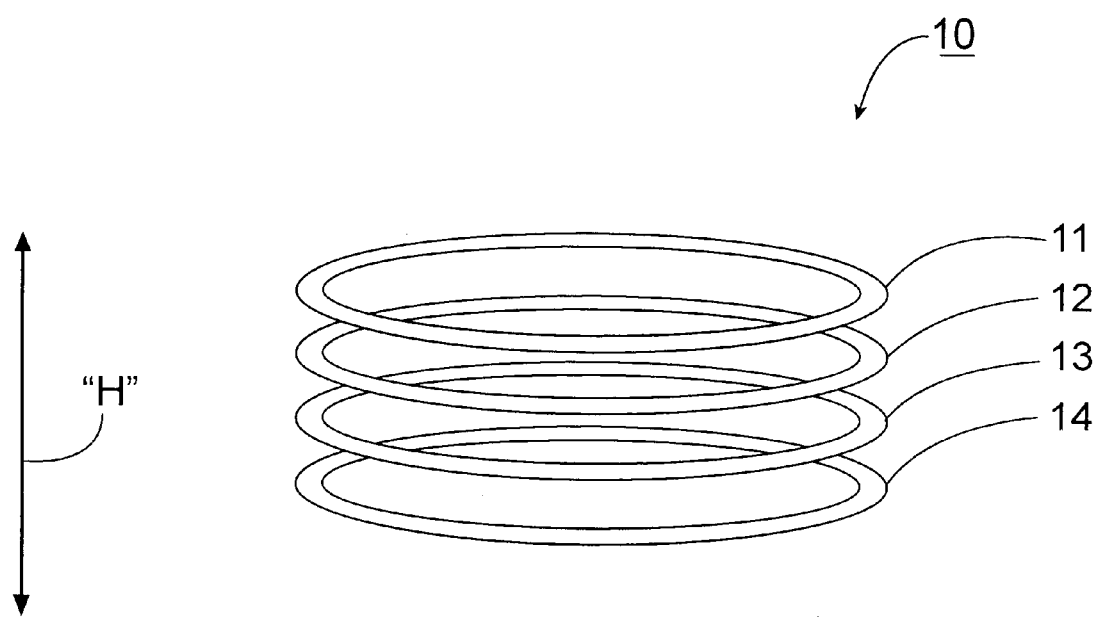
FIG. 1 is a front perspective view of a schematic diagram of a multi-tier oven according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity.

The present invention is directed to food processor systems that are particularly suitable for large-scale mass production of food items. The food processor system is a vertical rise system and can include different zones exposed to different processing conditions, such as one or more of a dryer, a heater, an oven, a curing or smoking source, a cooler or refrigerator or freezer and the like. The food processor can be configured to process solid or semi-solid food items or liquid items in containers or casings or shells. Examples of food items include, but are not limited to, baked goods, candies, bakery and dairy products, and meat products. Suitable elongated food items may include elastic or partially elastic food items such as cheese such as mozzarella strands, dough (for incubation), meat sticks or strands, and the like.

Of course, the processing system can be configured to convey or move other items through a processing facility where enhanced capacity is desired. For example, a product processing system for medical products, pharmaceuticals where sterilization is desired or for implements, surgical tools or other items desiring sterilization, or manufacturing facilities for products undergoing curing, coating, brazing, tempering, sintering, or other processing condition. See U.S. Pat. No. 4,582,047 and RE35,259, U.S. Pat. No. 5,942,265, U.S. Pat. No. 5,078,120, and U.S. Pat. No. 4,079,666 for discussions of exemplary processing conditions for food and conveyor means, the contents of which are hereby incorporated by reference as if recited in full herein.

In certain embodiments, the present invention is used to move a continuous or semi-continuous elongated meat product. For example, strands of meat such as pepperoni or beef, a processed meat product such as a pepperoni or beef stick, sausage, or hot-dog. The term "continuous" includes a continuous length of food product that extends from the food inlet to the food outlet during a period in the production run. Preferably, the length is continuous throughout at least one production shift. The elongated food item may be elastic (in at least the tensional direction) so as to allow stretching without unduly altering its desired shape during processing. Preparing the food in this manner may reduce the amount of meat that is cut from the end portions for discrete length products thereby increasing product yield over conventional systems. In other embodiments, semi-continuous lengths can be distributed into the food processor food inlet. As used herein "semi-continuous" means that the food item has a continuous length that is sufficient to cover at least two tracks or perimeter paths over at least one tier or level and preferably over a plurality of tiers or levels in the food processor.

Turning to FIG. 1, a stacked tier 10 is shown with a plurality of longitudinally spaced tiers 11, 12, 13, 14 configured to provide a desired vertical height(s) and residence time in each tier (or, combined, the residence time in the food processor). As used herein, the term "stacked" means that the tiers, shown as elements 11–14, are positioned as vertically or longitudinally spaced tiers, each tier extending within a certain vertical region of the processor. Each tier defines a portion of the travel path in the processor for the food item and can be any desired shape such as, but not limited to, circular, oval, rectangular, hourglass, or FIG. 8. The tiers can be arranged such that each tier overlies or underlies the next adjacent tier in the travel path. The travel path is the path that the food travels within a particular tier as it travels in the food processor from the inlet to the outlet. In certain embodiments, each tier or zone (a plurality of selected tiers) can be configured to have an individually controlled environment as is well known to those of skill in the art to provide the desired operating environments (to provide the desired physical treatments such as moisture or humidity (sprinkling), air velocity, gas exposure, temperature and the like).

In the food processor, the stacked tier 10 can be arranged such that selected or each tier is aligned or offset relative to the others, as desired. The height (shown as "H" in FIG. 1) and diameter or width and length of the stacked tier 10 can vary, and typically is sized corresponding to the desired residence time in a food processor unit. It is noted that although the tiers 11, 12, 13, 14 are shown as circular tiers, that is, coaxially arranged with circular and substantially planar travel paths in each tier, other shapes of tiers and shapes and orientations of respective travel paths can also be employed as will be discussed further below.

Figures 2A, 2B:
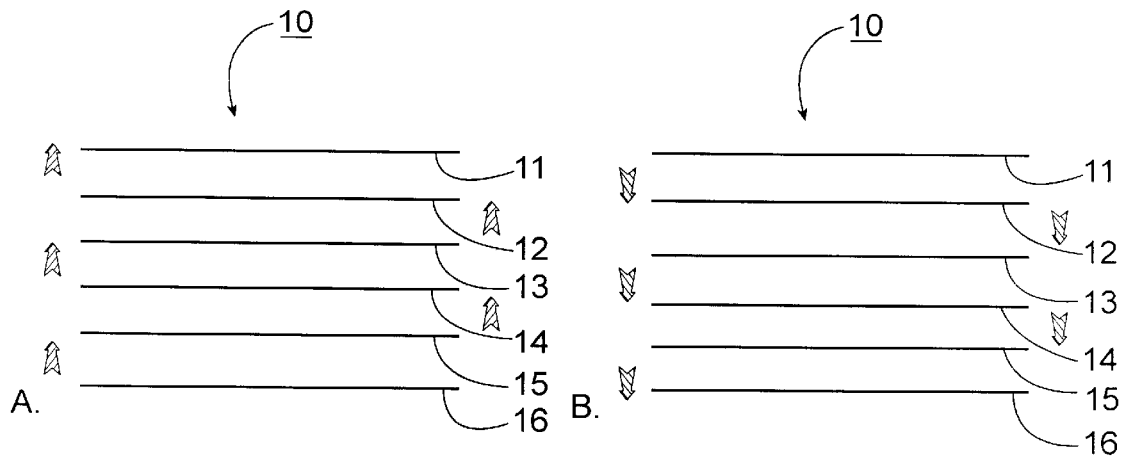
FIGS. 2A–2C are side views of stacked tiers according to embodiments of the invention.

For example, as shown in FIG. 2A, the stacked tier 10 can be configured with a plurality of vertically aligned planar tiers 11–16, which are configured to direct the food item(s) to travel up (illustrated by the arrow direction). FIG. 2B shows that the stacked tier 10 can be arranged with multiple tiers 11–16 that, in operation, direct the food down (illustrated by the arrow direction).

Figure 2C:
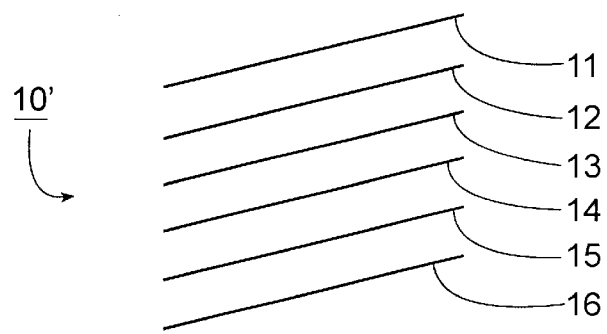

FIG. 2C illustrates that the stacked tier 10' can include tiers 11–16 which are aligned but inclined or angled. In addition, the tiers can be alternately angled or inclined (in the same or alternate directions as desired to define the travel path in the processor).

Figure 3A:
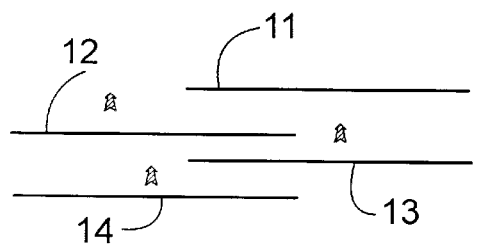
FIGS. 3A–3B are side views of misaligned or offset adjacently located tiers with the product diverted up through the processor according to embodiments of the present invention.
Figure 3B:
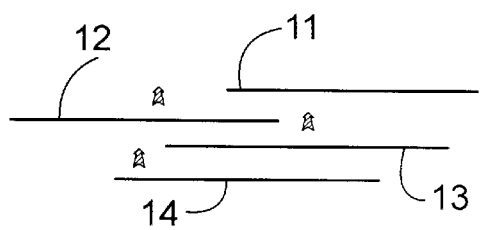
Figure 3C:
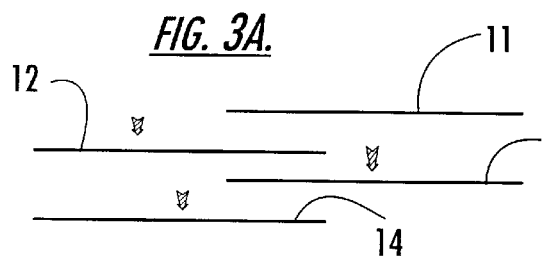
FIGS. 3C–3D are side views of misaligned or offset adjacently located tiers with the product diverted down through the processor according to embodiments of the present invention.
Figure 3D:
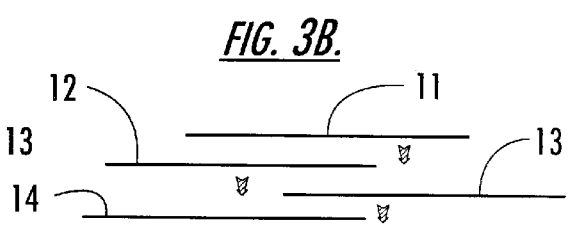

FIGS. 3A and 3B illustrates that the stacked tiers 10 may be misaligned (each tier or selected tiers offset with respect to other tiers within the stack 10). As shown, alternating tiers are offset a lateral distance with respect to the underlying and overlying tier. FIG. 3A illustrates that the alternating tiers are aligned (i.e., 11 and 13 and 12 and 14) while FIG. 3B illustrates that all of the tiers have a different center placement. FIGS. 3C and 3D illustrate embodiments similar to FIGS. 3A and 3B but showing that the food item(s) can be configured to travel down instead of up (as shown by the direction of the arrows in the figures).

Figure 4A:
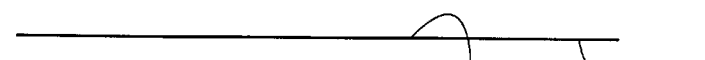
FIGS. 4A–4C are side views of examples of alternative shapes of travel paths for a tier according to embodiments of the present invention.
Figure 4B:
Figure 4C:

FIG. 4A illustrates that the tier 11 can be configured to define a travel path 11p which is substantially planar. Alternatively, as shown in FIGS. 4B and 4C, all or a portion of the travel path 11p',11p", respectively, in each tier 11, 11' (or selected tiers) may be non-planar, such as, but not limited to, ramped up and down (FIG. 4B), curvilinear or wavelike (FIG. 4C) when viewed from the side. Each tier or selected tiers can be configured similarly or differently as desired with a same travel path shape (with the same or differing travel distances and/or the same or different vertical and horizontal path within each tier).

Figure 5:
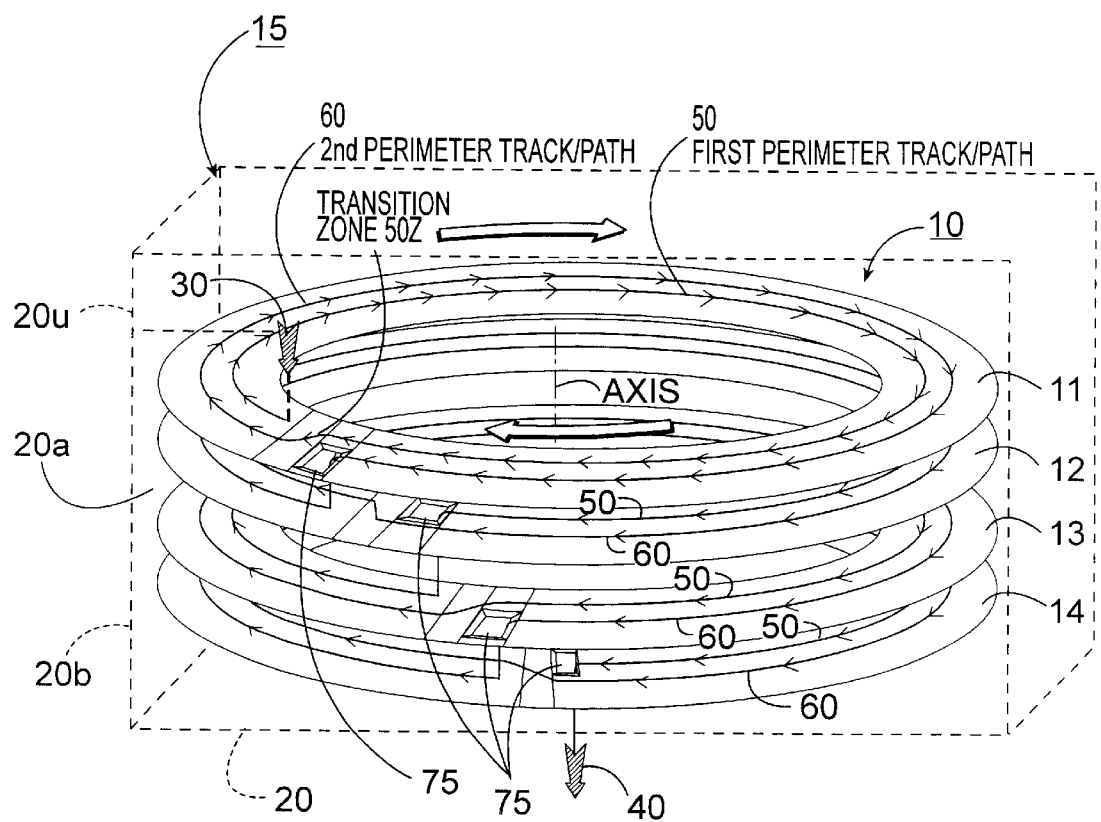
FIG. 5 is a front perspective view of a food processor with stacked tiers according to embodiments of the present invention.

As shown in FIG. 5, a food processor 15 can be configured so that a plurality of tiers 10 are mounted inside a housing 20 (shown in dotted line) which provides an enclosed processing space 20a to protect the food items from external environmental contamination. The food processor 15 can include a food inlet 30 and a food outlet 40. As shown, in operation, the food progresses from a top portion 20u to a bottom portion 20b of the housing 20, but the system can be configured so as to operate in the reverse.

FIG. 5 illustrates that each tier has at least two serially arranged perimeter travel paths 50, 60 thereon. As shown, the two perimeter travel paths can be described as an innermost travel path 50 and outermost perimeter travel path 60. Of course, additional intermediate perimeter travel paths can also be disposed on one or more tiers so as to cause the food to travel greater than one revolution on a single tier before the food item(s) travel to the next tier. In certain embodiments, the system is configured such that the food travels at least about 1.1–1.25, and typically about two or more revolutions, on a single tier (and in certain embodiments greater than one revolution on a plurality or all of the tiers within the processor).

In certain embodiments, the system can be configured such that the food moves more than one revolution on a single conveyor (i.e., the conveyor may be looped or have multiple tracks thereon so as to define more than one perimeter travel path) before moving to a second conveyor or the next tier. In other embodiments, a plurality of cooperating conveyors are used on each tier to define the perimeter paths, as will be discussed further below. Combinations of each of these conveyor configurations are also contemplated.

For ease of discussion, the invention will be primarily described hereafter using a travel path which is down, however, as noted above, the invention is not limited thereto as other travel paths can also be employed as contemplated by the present invention.

As shown in FIG. 5, the food is introduced at inlet 30 and is directed to move (or drop) down to a primary upper surface of the tier 11 to travel clockwise a first revolution about a first perimeter path 50 (indicated by the clockwise arrows along the perimeter path 50) until it reaches a transition or junction zone 50z where the food physically moves or transitions over to travel a second revolution (or portion thereof) on the second perimeter travel path 60. As such, the food item travels greater than one revolution on the first tier, and typically, at least about 1.1–1.25, and preferably at least about 1.5 to about two revolutions, before it is directed to the next tier 12.

As is also shown in FIG. 5, after the food travels to approach the second revolution, it approaches a transfer region 75 which disrupts the perimeter travel path 60 causing the food to enter the transfer region 75 and travel to the next adjacent tier 12 onto an adjacent (shown as underlying) perimeter travel path 60. This time, the outermost perimeter travel path 60 is the first one the food follows on this tier 12. That is, the food alters the sequence of travel on the perimeter paths 50, 60 tier to tier so as to travel inner to outer and then outer to inner as it progresses down (or up) the tiers in the stack 10.

FIG. 5 also illustrates that the transfer regions 75 may be circumferentially spaced or offset on each tier level so that the food transfers only a desired distance to the next underlying adjacent tier. In addition, the transfer regions can be formed into alternating inner and outer travel paths 50 to 60 tier to tier. The transfer regions 75 may be defined as open spaces which allow the food to drop (via gravity) down to the next level or as shoots, conveyors or other transfer means.

Figure 6:
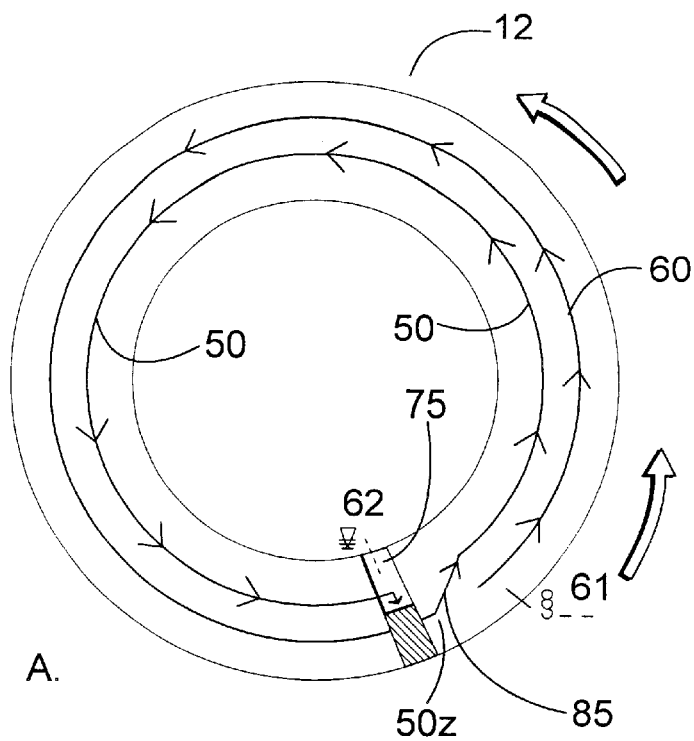
FIG. 6 is a top view of a tier illustrating a multi-revolution travel path for a food product thereon.
Figure 7:
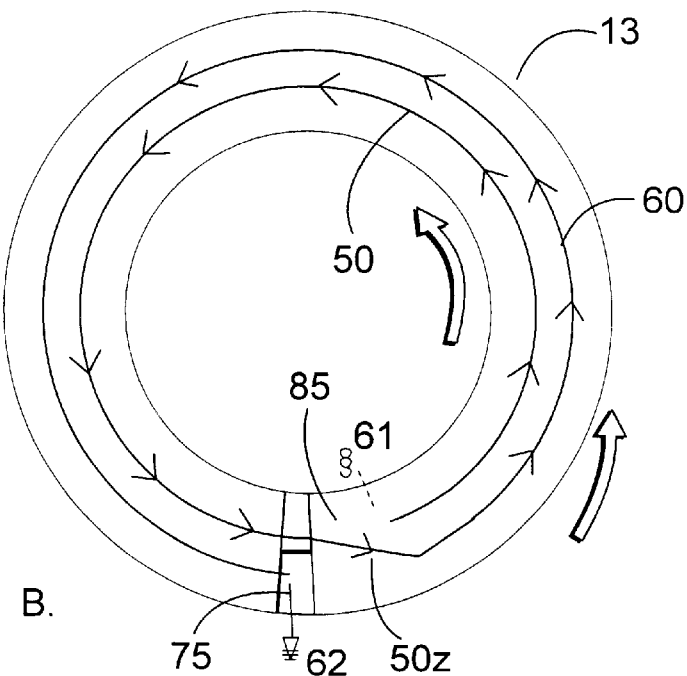
FIG. 7 is a top view of a tier configured to be adjacent (over or under) the tier shown in FIG. 6, alternating the lateral travel path of the product from that shown in FIG. 6 according to embodiments of the present invention.

FIG. 6 illustrates a counter clockwise movement configuration for a tier (shown as intermediate tier 12). As shown, the food is introduced at starting location 61, travels in a counter clockwise manner about the outer perimeter path 60, serially moves through the transition zone 50z and onto inner perimeter path 50 where it moves also in a counter clockwise manner about a major portion of the second perimeter travel path (here the inner path) to approach the gap zone 75 where it moves to tier 13 (FIG. 7). The food then falls onto starting location 61 on tier 13 where it follows around the inner perimeter path 50 so as to complete a first revolution and then progresses through the transition region 50z where it then serially follows the second or outer perimeter path 60 until it reaches the transfer region 75 where the food moves to the next level or tier 14 (FIG. 5).

Figures 8A, 8B:
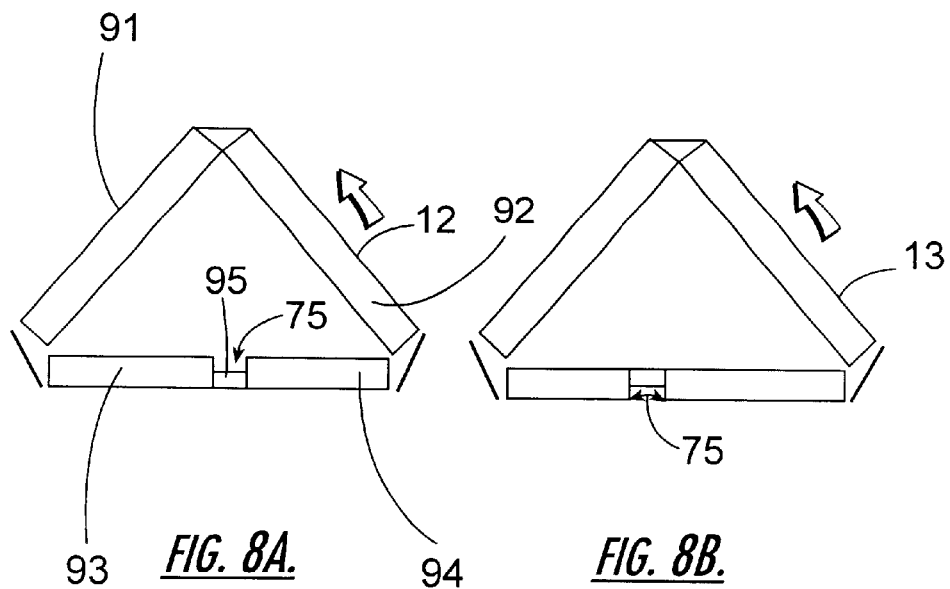
FIGS. 8A–8B are top views of a non-circular travel path using a plurality of adjacent conveyors at each (or selected) tier level to divert the product according to embodiments of the present invention.
Figures 9A, 9B:
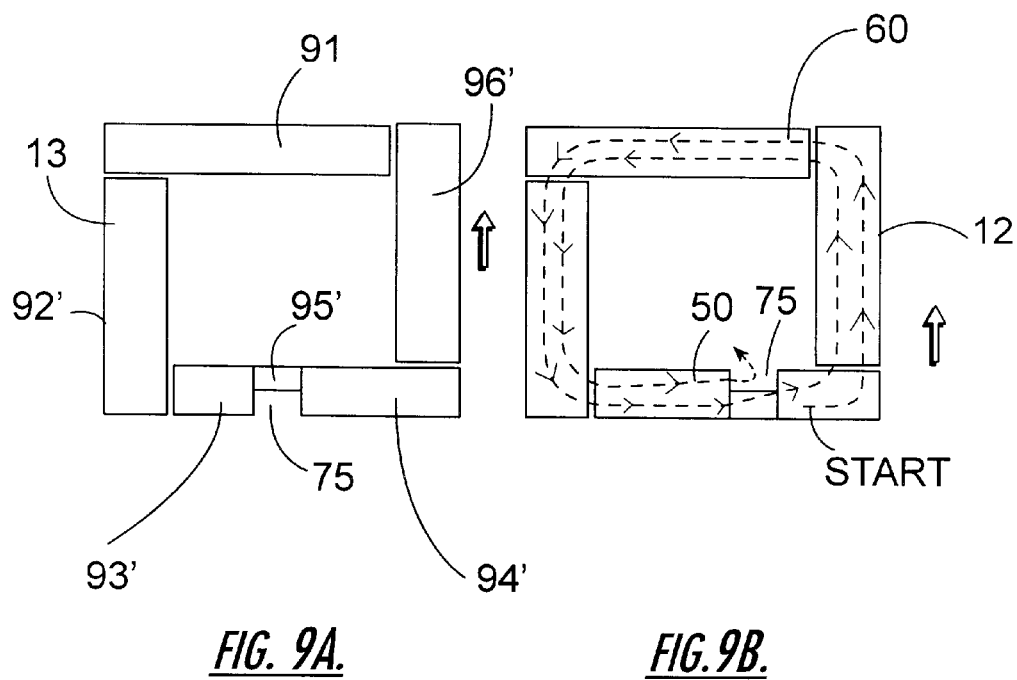
FIGS. 9A–9B are top views of an alternative configuration of a non-circular travel path using a plurality of adjacent conveyors at each (or selected) tier level to divert the product according to embodiments of the present invention.

As shown in FIGS. 8A–8B and 9A–9B, in addition to the potential variation in the configuration of the travel path in the vertical direction as shown for example in FIGS. 2–4, the shape of the tier, as viewed from the top, is also not limited to the circular travel path shown in FIGS. 5–7, and each travel path can be different in the horizontal configuration as desired. For example, a plurality of adjacently spaced conveyors can define the perimeter travel paths 50, 60. FIGS. 8A and 8B illustrate that five linear conveyors 91, 92, 93, 94, 95 can be arranged to define a triangulated travel path on a tier 12, 13. Conveyor 95 can be configured with a width which is less than opposing sides of the path to allow the food to be diverted as it travels around the path. FIGS. 9A and 9B illustrate that six conveyors 91', 92', 93', 94', 95' and 96' can be arranged to define a rectangular path. Of course, endless conveyor configurations can also be used to define circular, FIG. 8 or oval paths (not shown).

FIG. 10A illustrates that a tier 11 can comprises at least two (two or more) side-by-side cooperating conveyors 150, 160 to define the respective travel path 11p. The conveyors 150, 160 "cooperate" in that they are configured to operate together to either hand off or receive food from the other conveyor so that the food serially travels first one then the other, as shown from either the inner perimeter path 50 to the outer 60, or visa versa. In the embodiments shown in FIGS. 10A–10B, the conveyors are arranged as cooperating laterally extending pairs 100 which move food from the inner path to the outer path, 50, 60, respectively, but three or more conveyors can also be configured to cooperate and move food about the tier in any number of desired revolutions. Additionally, two or more sets of cooperating conveyors can be used to concurrently process different food items (or strands or sets of items) about the same tier (not shown).

FIG. 10B illustrates that a tier 11 can be configured with a single conveyor 140 which has multiple tracks, shown as 140a, 140b which corresponds to the perimeter travel paths of the tier, 50, 60, respectively, so as to provide the greater than one revolution travel path 11p for the tier 11.

In certain embodiments, as shown for example in FIGS. 10C and 10D, a plurality of cooperating conveyors 150a, 150b, 150c are serially arranged in-line to define the inner perimeter travel path 50 while a plurality of cooperating conveyors 160a, 160b, 160c are arranged to define the outer travel path 60. FIG. 10C illustrates a total of six conveyors (each different conveyor illustrated by a different contrasting background). In contrast, FIG. 10D illustrates the use of four conveyors, 350a–d, three of which are primary conveyors 350a–c and one of which is a secondary conveyor, 350d. In this embodiment, the perimeter travel paths 50, 60 are carried side by side on this configuration until the transfer region 75, where the two spaced apart primary conveyors 350a, 350c are co-joined by the secondary conveyor 350d which has a smaller width than the primary ones.

In the embodiments shown in FIGS. 10C and 10D, the tier 11 includes both cooperating side by side and in-line conveyor arrangements. Of course other combinations of conveyors (such as side by side alone or in-line alone or other quantities or shapes/travel path configuration conveyors) can also be used.

FIGS. 11A–11F illustrate that a single conveyor 140' can be looped a desired number of times to define a desired travel path 11p with greater than one revolution. In this embodiment, the number of revolutions of the travel path corresponds to the number of loops (or partial loops) defined by the conveyor 140'. FIG. 11C illustrates a reduced second travel path distance (just over one revolution) while FIG. 11B illustrates about a 1.25 revolution, and FIG. 11A illustrates about a 1.5 revolution. FIG. 11D illustrates about two revolutions, and FIGS. 11E and 11F illustrates greater than two revolutions. As before, the single looped conveyor can be configured as a plurality of serially in-line conveyors or conveyors with intermediate shoots.

Figures 12A, 12B:
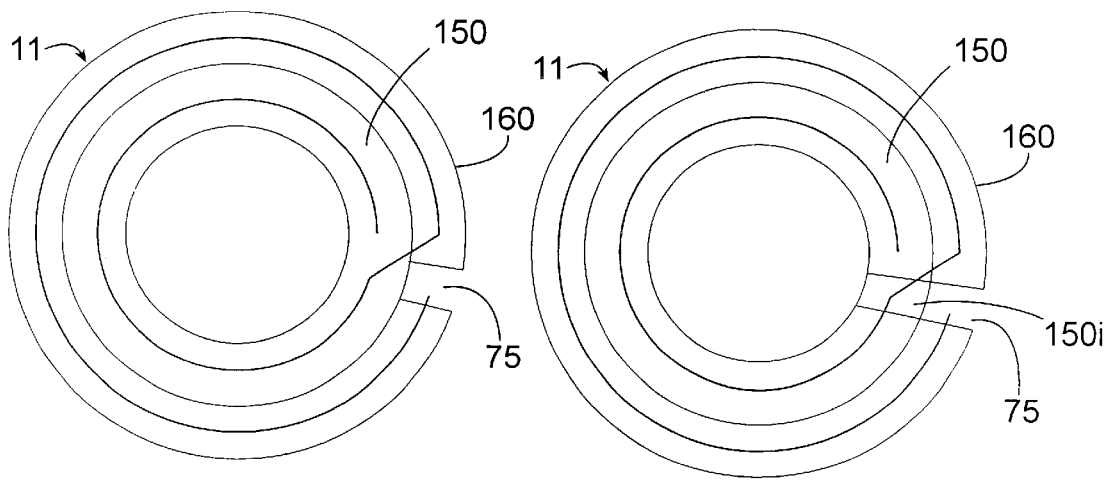
FIG. 12A is a top view of a multiple pass travel path on a tier formed by a plurality of side-by-side conveyors according to embodiments of the present invention, the inner portion of the travel path being formed by a single conveyor loop and the outer portion of the travel path being formed by another conveyor.
FIG. 12B is a top view of a multiple pass travel path similar to the configuration shown in FIG. 12A formed with an additional conveyor positioned in the travel path to complete the inner portion of the travel path.

FIG. 12B illustrates that a conveyor can be discontinuous along the travel path defined thereby. As shown, the inner travel path 50 includes an intermediate conveyor 150I to form a portion thereof. The same can be used to form the outer or intermediate perimeter paths as desired. Alternatively, as shown in FIG. 12A, the conveyor 150 can be configured as a circular contiguous body to define a circular path.

As for the embodiments shown in FIGS. 10C and 10D, the tier can be arranged with serially in line or adjacent cooperating conveyors. For example, the travel path arrangement shown in FIG. 12A may be configured with two adjacent conveyors while that shown in FIG. 12B may be from two primary side by side and one secondary serially in line conveyor (having a smaller width relative thereto).

Figure 13A:
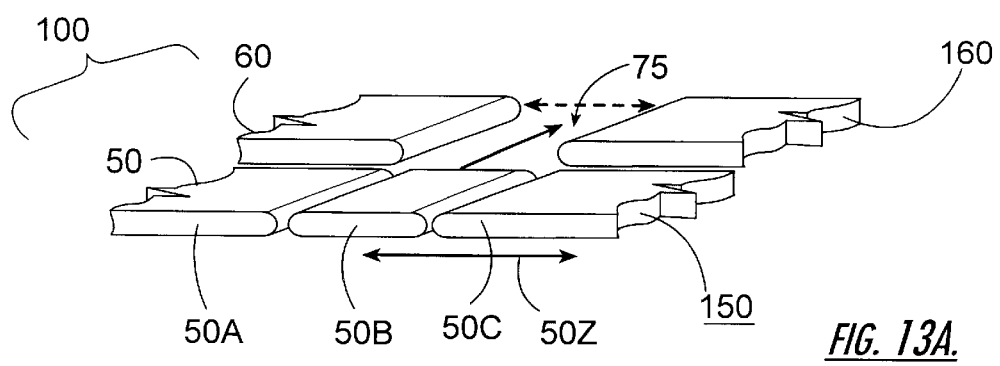
FIG. 13A is a side perspective view of a junction region forming a portion of the food travel path in the tier according to embodiments of the present invention.

As shown in FIG. 13A, the two (or plurality) of perimeter travel paths 50, 60 are side-by-side coaxially aligned and substantially co-planar cooperating conveyors 150, 160. As described above, the conveyors 150, 160 "cooperate" in that they are configured to operate together to either hand off or receive food from the other conveyor so that the food serially travels first one then the other. In the embodiment shown, the conveyors 150, 160 are arranged as cooperating pairs 100 but three or more conveyors can also be configured to cooperate and move food about the tier in any number of desired revolutions. Additionally, one conveyor or two or sets of cooperating conveyors can be used to concurrently process different food items about the same tier (either spaced inward or outward from the tier described above).

FIG. 13A also illustrates how a junction region 50z and transfer region 75 may be configured. As shown, the inner travel perimeter path 50 includes three conveyor segments, 50A, 50B, and 50C. The intermediate conveyor segment 50B is a bridging segment which supports the food through the drop zone or transfer region 75 where it can then be diverted onto the next adjacent travel path.

Figure 13B:
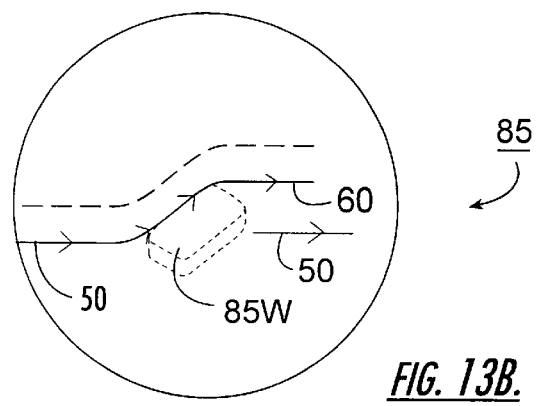
FIG. 13B is a top view of a food diversion means according to embodiments of the present invention.

As noted in FIGS. 6 and 7, a food diverter or diversion means 85 can be used to physically direct the food from one perimeter path to the other or more than one revolution (into a different track) on the same perimeter path. For example, a rod diverter or suspended wedge shaped pointer (not shown), forced air, or, as shown in FIG. 13B, a surface mounted wedge 85w can cause the directional change. Other diversion means can be used as desired as is known by those of skill in the art. In addition, in certain embodiments, the transfer region 75 may be alternatively configured with a positive transfer mechanism such as a ramp, chute, forced air, or vacuum or other conveyance structure to help direct or move the food to the next tier (above, below, or laterally spaced tier).

Figures 14A, 14B:
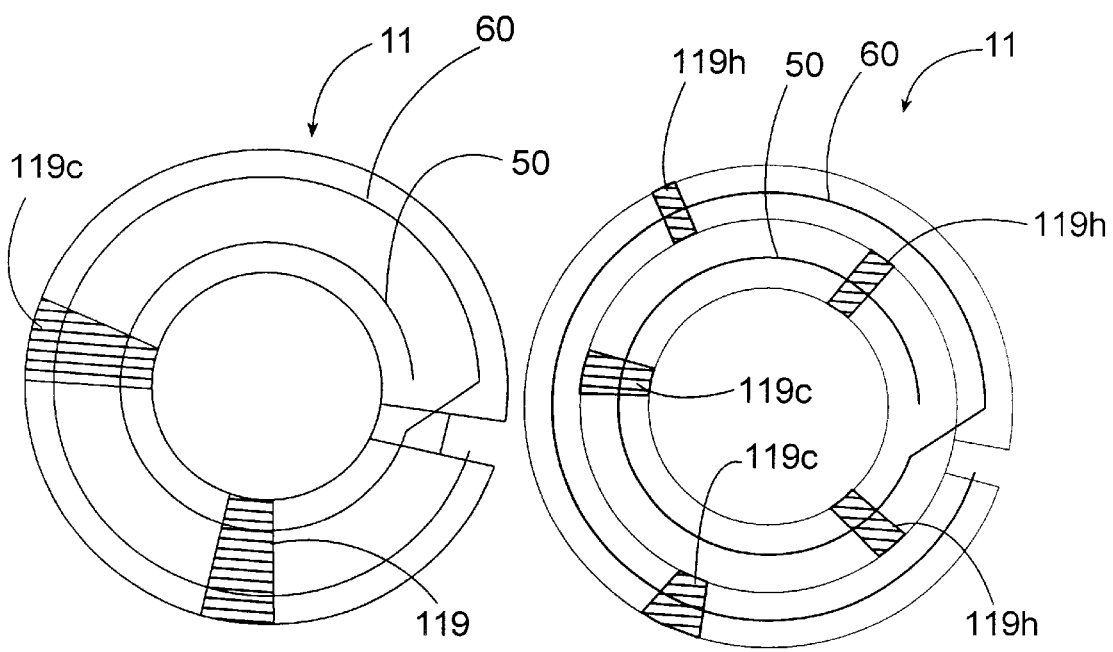
FIGS. 14A–14B are top views of tiers using one or more conveyors with components operably associated therewith to help direct the food item along its travel path (i.e., shoots, connectors, diversion means, etc.) according to embodiments of the present invention.

FIGS. 14A and 14B illustrate that the primary surface of the tier 11, which provides the travel surface, can include additional conveyors, shoots, connectors, diversion means or food placement or alignment holding means (shown as 119c for conveyors and 119h for diversion means) to help direct the food item to travel greater than one revolution about the tier 11 in the desired travel path position and/or so as to maintain desired spacing between food products as the food moves therealong. Certain of these components can be stationary or non-moving relative to the conveyor or the food item as will be appreciated by those of skill in the art. As before, the travel path can be formed from one or more conveyors. For example, the embodiment shown in FIG. 14A may be formed from four conveyors with two shoots 119 while that shown in FIG. 14B may be formed from six conveyors and five shoots 119.

Figure 15A:
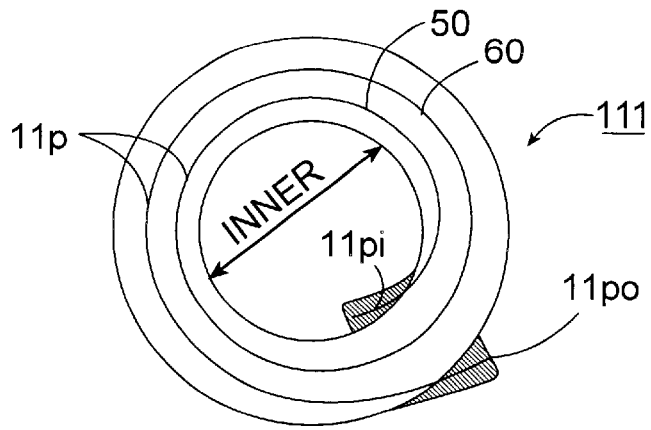
FIGS. 15A–15C are top views of a full circle design with food transfer positions positioned beyond the perimeter thereof according to embodiments of the present invention.
Figure 15B:
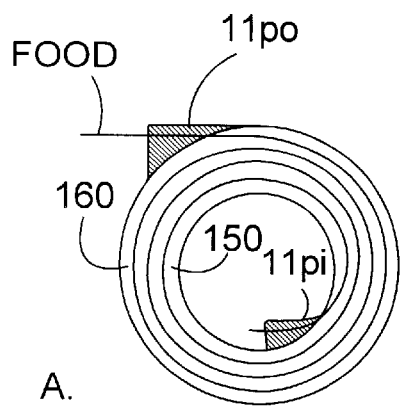
Figure 15C:
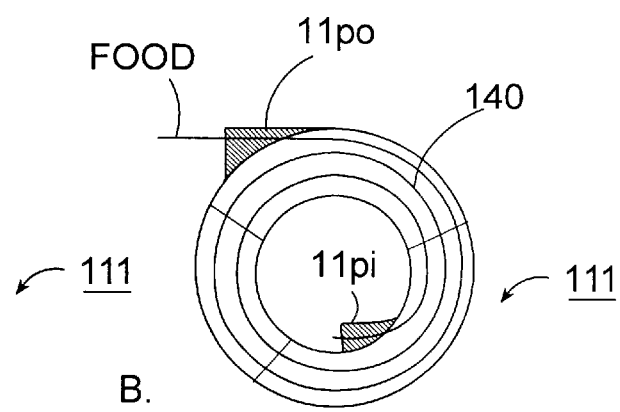

FIG. 15A illustrates yet another embodiment of a disk shaped tier 111 with a substantially circular travel path 111p. As shown, the tier includes an inner and outer port, $11p_i$, $11p_o$, respectively, used to receive food in or direct food out, depending on the location in the stacked tier 10 and the desired travel path therealong. As shown, these ports are positioned adjacent but beyond the outer or inner periphery or perimeter of the tier. That is, the food transfer points for the exchange of the food item from one tier to another are positioned a distance away from the tier travel path itself. FIG. 15B illustrates that, in operation, the food item is spiraled about the tier travel surface to travel greater than one revolution thereabout (shown as about two revolutions). FIG. 15B illustrates that a plurality of cooperating conveyors 150, 160 can be used to define the travel path 11p on the tier 111. FIG. 15C illustrates that a single conveyor can be configured so that the food follows multiple tracks (in a spiral pattern) thereon to travel greater than one revolution at the tier before moving to the next tier.

As described above, the embodiment shown in FIG. 15B may be formed from one conveyor, two cooperating side by side conveyors and/or a plurality of serially in line conveyors (shown in FIG. 15C as three arcuate serial in line conveyors as represented by the lateral slice line extending radially from the inner to the outer portion of the tier).

Figure 16A:
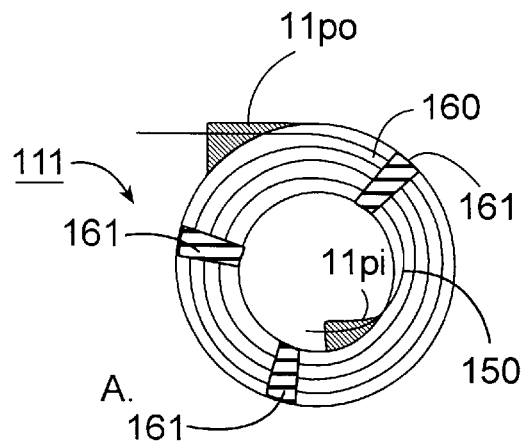
FIGS. 16A–16B are top views of the circular conveyor track illustrated in FIGS. 15A–C, showing that additional components can be used to help direct the food along its desired travel path according to embodiments of the present invention.
Figure 16B:
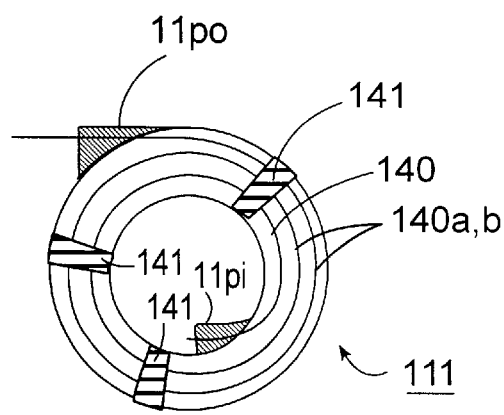

FIGS. 16A and 16B illustrates that the tier 111 surface can include intermediate conveyors 161, 141, respectively (and/ or connectors, shoots, holders, diversion means etc.) as noted above. FIG. 16A shows a plurality of cooperating conveyors 150,160 (each with at least one track to define greater than one revolution thereabout) and FIG. 16B shows a single conveyor 140 (with multiple tracks 140a, 140b, 140c). The intermediate conveyors can be configured to provide a travel path which is angled from that of the primary direction of the perimeter travel paths such that the food laterally translates a desired distance as it travels over same to take up a position inward (or outward) of that which it had prior to entering the intermediate conveyor region.

In certain embodiments the configuration of the tier 111 in FIG. 16B can be arranged as three serially inline conveyors with three shoots 119 (the three conveyors ending into opposing sides of the shoots). Alternatively, the configuration shown in FIG. 16A may be formed from six conveyors (three primary and three secondary) or as six conveyors with three (or six or more if discrete width shoots are used) shoots.

That is, the shoots 119 may be arranged to provide a portion of the floor and can be serially spaced about the inner and/or outer travel paths. The shoots 161 may be stationary or may float (such as mounted on wheels or air or casters) but are typically not conveyors. In certain embodiments, the shoots 119 can be formed of perforated stainless steel or other suitable material which completes a portion of the travel path at a desired portion of the perimeter path 50, 60 to help direct the food thereover. The shoots 119 can be planar or inclined, as desired depending on the application, and can be mounted to the conveyor or externally mounted.

Figure 17A:
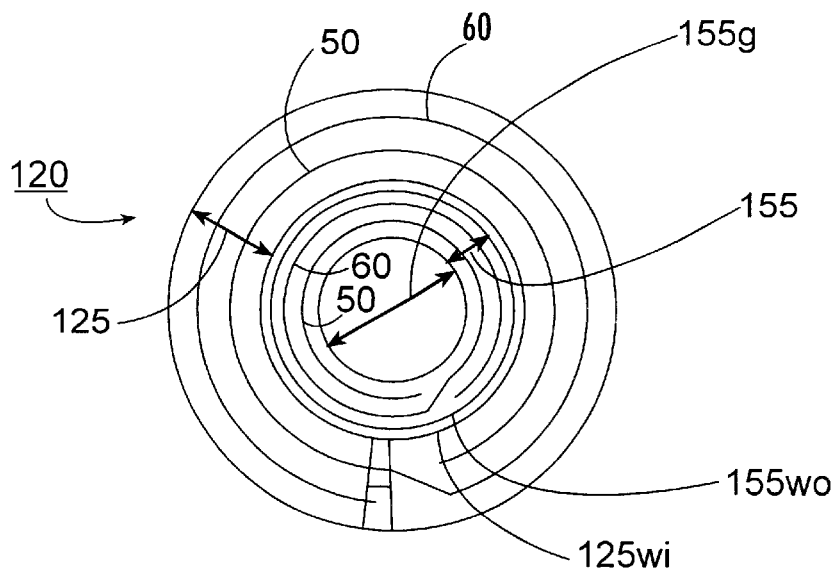
FIG. 17A is a top view of a dual oven in oven configuration according to embodiments of the present invention.
Figure 17B:
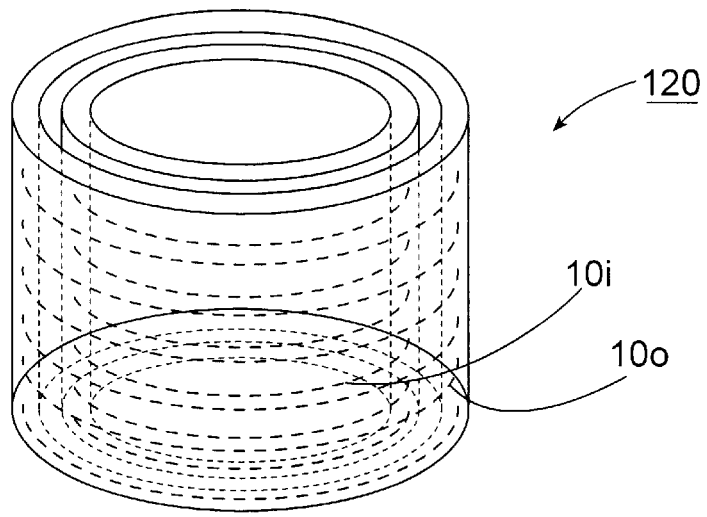
FIG. 17B is a side perspective view of the dual oven shown in FIG. 17A.

FIGS. 17A and 17B illustrate a nested oven 120 configuration where an outer oven 125 is configured to surround or encase at least one inner oven 155. Each of the ovens 125, 155 can have separate enclosures or the outer wall of the inner oven 155wo can define the inner wall of the outer oven 125wi. In certain embodiments, each of the ovens 125, 155 can be separately insulated and regulated for desired operating environments (to provide the desired physical treatments such as moisture, humidity, air velocity, temperature and the like). In addition, each tier or zone (a plurality of selected tiers) can be configured to have an individually controlled environment as is well known to those of skill in the art.

During typical production schedules (not requiring tear down), easy access to clean or repair the outer oven 125 can be obtained via the outer wall 125wo for the outer oven 125 and via the inside wall 155wi by entering the gap of the cylinder 155g for the inner oven 155 (access stairs may be provided in the inner oven center space and about the outer wall of the outer oven as needed). As shown, the nested configuration uses two ovens, both of which may be annular. In other embodiments, rectangular, oval, square or other desired shapes can also be used.

In addition, instead of two nested ovens, the nested vertical ovens or processors, can be configured as a plurality of (i.e., two, three or more) horizontally spaced and nested vertically extending ovens (the horizontal spacing configured to provide maintenance access).

As shown in FIG. 17B, each of the ovens 125, 155 can include multiple vertically stacked tiers 10o, 10i, respectively. In addition, each tier may be configured with one 140 a plurality of cooperating conveyors 150, 160 (or one or more cooperating pairs of conveyors) so that the food travels serially about at least two different perimeter paths and greater than about one revolution on each tier (or selected tiers) as described above. The nested oven configuration can increase the production capacity for a bounded spatial region (providing two ovens within a single bounded spatial region or footprint). That is, two or more ovens can be provided within a single footprint.

As before, the speed of the conveyor(s) can be set to match the desired residence time according to the time desired in each tier. In certain embodiments, the oven can be configured with a height of between about 20–40 feet with a length of between about 60–400 feet and a width of between about 20–100 feet running an elongated meat product at about 5–6.5fps (feet per second). Of course, the processors or ovens of the present invention are not limited thereto, as any desired profile (height×width×depth) can be used depending on the floor space and ceiling limitations and the capacity or processing (time) requirements.

In certain embodiments, the oven 200 can be configured with a plurality of vertically stacked layers 201, 202, 203 et seq. to 201n and the elongated meat product or strand can be directed to travel over each of the layers 201, 202, 203 at a desired rate. For example, for food dwelling at about 1 minute per layer, and a 60 layer configuration, the food will have an oven dwelling time of about 1 hour.

In certain embodiments, the oven 200 can be configured to throughput of at least about 5,000–23,000 feet per hour of a food item, typically an elongated meat product.

As noted above, the perimeter travel paths 50, 60 can be defined by a plurality of cooperating conveyors 150, 160. These conveyors 150, 160 may be individually operated or adjusted so as to run at the same or different conveyor speeds. In certain embodiments, where one conveyor defines an outer perimeter path and the other an inner perimeter path 60, 50, respectively, as the food on the inner track or perimeter path. Typically the inner perimeter path 50 has an associated shorter travel distance than the outer path. In certain embodiments, the speed of each tier can be separately adjusted so that conveyors 150, 160 on each tier can run at the same or different speeds or at variable speeds relative to the others.

In certain embodiments, the processor 15 can be configured to concurrently process a plurality of elongated strands (such as, but not limited to, about 4–50 strands). In certain embodiments, about seven-fourteen separate strands of elongated continuous food product can be introduced into the food inlet and onto the upper tier. In so doing, the perimeter paths 50, 60 can include holding grooves or guides to help position the strands side-by-side on the respective travel paths in each tier. In addition, a plurality of food diverters 85 can be positioned in the transfer zone 50z to divert the strands to the other adjacent travel path. As such, each single food line or travel path shown in FIGS. 5–19 can represent a plurality of side-by-side products, which travel concurrently serially about each of the perimeter paths to make the desired number of revolutions at each tier.

FIG. 18 illustrates that the stacked tier 10 can be arranged such that the food travels up and down in selected tiers (not having to follow a single direction such as up or down as the food travels through the processor). A single stacked tier can be used (where selected tiers are misaligned) or a plurality of stacked tiers (such as those provided in adjacent dual ovens) can be arranged such that at selected levels or tiers, the food travels laterally over to the adjacent tier.

As shown for example, in FIG. 18, four separate stacks of tiers $10_1$, $10_2$, $10_3$, $10_4$ are in communication. In operation, the food may travel down a first portion of a first stacked tier set $10_1$, then move laterally over to a second $10_2$ and travel up and then down the second stacked tier $10_2$, travel laterally over to the third tier $10_3$ where it can move up and then down and then laterally over to the fourth tier $10_4$. Of course, many variations are possible and the spaced tiers within each stacked tier 10 may be aligned or misaligned and the travel path may be such that the product serially travels down a number of tiers and then up and skips adjacent ones as desired. Certain of the stacked tiers may be configured within different ovens (or processing equipment) or all of the stacked tiers may be within a single processing unit.

FIGS. 19A and 19B illustrate that two circular tiers 111 having spiral travel path patterns thereon (as discussed for FIGS. 15–16) can be arranged to be side-by-side so as to be able to laterally transfer food between selected sets of stacked tiers.

It is noted that the present invention also contemplates that stacked tiers 10 can be configured as any suitable or desired combinations of the tier configurations, the conveyor configurations and/or travel paths described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to That which is claimed is:

1. A method for directing food through a multi-tier food processor, comprising:
   conveying at least one food item over a predetermined travel path in a food processor having a plurality of vertically stacked tiers which are longitudinally spaced apart such that the food item travels greater than one revolution in a first tier before it moves to the next selected tier.

2. A method according to claim 1, wherein each tier is configured with a plurality of travel perimeter paths thereon, each of the travel perimeter paths forming a serial portion of the predetermined travel path so as to direct the at least one food item to travel a predetermined distance about a major portion of a first perimeter path and then alter its travel path on the respective tier to travel a predetermined distance about a major portion of a second perimeter path, wherein the second perimeter path is different from the first perimeter path.

3. A method according to claim 2, wherein the first perimeter path surrounds a major portion of the second perimeter path.

4. A method according to claim 3, wherein the second perimeter path surrounds a major portion of the first perimeter path.

5. A method according to claim 2, wherein the first and second perimeter paths are spaced in side-by-side alignment.

6. A method according to claim 2, wherein the first and second perimeter paths are substantially coplanar when viewed from the side.

7. A method according to claim 3, further comprising directing the at least one food item to move from a first tier to an adjacent second tier.

8. A method according to claim 1, wherein the predetermined travel path includes a plurality of transfer regions, a respective one for each tier, which allows the at least one food item to move to the next selected tier.

9. A method according to claim 1, wherein each tier defines a portion of the predetermined travel path, and wherein each tier comprises a plurality of adjacently arranged cooperating side-by-side conveyors.

10. A method according to claim 9, wherein the plurality of side-by-side conveyors on each tier are radially spaced apart about a common center axis and wherein each conveyor is configured to define a circular perimeter travel path thereabout.

11. A method according to claim 9, wherein the side-by-side conveyors on each tier are cooperatively arranged so that the at least one food item travels a major portion of a perimeter corresponding to a first conveyor and then is directed to an adjacent conveyor such that the at least one food item then travels a major portion of a perimeter of a second conveyor.

12. A method according to claim 1, wherein at least one tier comprises a conveyor which is configured to define a first and at least a portion of a second travel track thereon, the second travel track being laterally spaced apart from the first, and wherein the at least one food item travels over the first and at least a portion of the second travel track to travel greater than one revolution in the tier before moving to the next selected tier.

13. A method according to claim 12, wherein the first and second travel tracks are configured from a looped conveyor.

14. A method according to claim 12, wherein the conveyor defines a spiral travel surface pattern thereon.

15. A method according to claim 1, wherein the at least one food item travels greater than one revolution in a plurality of the tiers.

16. A method according to claim 1, wherein the at least one food item travels at least about 1.5 revolutions in a first tier before moving to a second tier where the at least one food item travels at least about 1.5 revolutions before moving to a third tier where the at least one food item travels at least about 1.5 revolutions before moving to a fourth tier.

17. A method according to claim 9, wherein one of the conveyors runs at a first speed and another of the conveyors runs at a second speed different from the first speed on at least one of the tiers.

18. A method according to claim 2, further comprising alternating the lateral travel pattern of the at least one food item as it moves between adjacent tiers such that the food item travels from an inside to an outside perimeter on a first tier and then an outside to an inside perimeter on an adjacent tier.

19. A method according to claim 1, wherein each tier has a desired temperature associated therewith and the at least one food item is exposed to the tier temperature for a time corresponding to the conveyor speed as it travels through that tier.

20. A method according to claim 1, wherein the at least one food item is an elongated food item.

21. A method according to claim 1, wherein the at least one food item is a substantially continuous length elongated meat product.

22. A method according to claim 1, wherein the food processor comprises an inner column of tiers and an outer column of tiers, each column defining a separate travel path for a desired at least one food item, and wherein the outer tier is configured to encase the inner tier.

23. A method according to claim 22, wherein different food items are concurrently directed to travel through the inner and outer column of tiers.

24. A method according to claim 22, wherein the inner column of tiers correspond to an inner oven and the outer column of tiers correspond to an outer oven, and wherein each of the inner and outer column of tiers at each tier level are separately regulated for desired operating environments.

25. A method according to claim 1, wherein the at least one food item is an elongated meat product having a length which extends over a major portion of the predetermined travel path.

26. A method according to claim 1, wherein the at least one food item is an elongated meat product with a length which is sufficient to extend over a predetermined portion of the travel path corresponding to at least a plurality of tiers.

27. A method according to claim 26, wherein the at least one food item is an elongated meat product which has a length which extends over substantially the entire predetermined travel path in the food processor.

28. A food processing apparatus comprising:
   a housing defining an enclosure and having a food inlet and a food outlet; and
   a plurality of stacked tiers residing in said housing, each of said tiers including at least one conveyor configured to move a food product in a predetermined travel path over a primary surface of a respective tier such that the food product moves in a first path having a first perimeter and then to a second path having a second perimeter different from the first perimeter so as to travel greater than one revolution in each tier.

29. An apparatus according to claim 28, wherein said at least one conveyor for each tier comprises a conveyor which is configured to define greater than one revolution and to define a serial portion of the travel path for a respective tier thereby directing the food product to travel greater than one revolution on the same conveyor.

30. An apparatus according to claim 28, wherein said at least one conveyor comprises a conveyor which is configured to move the food product more than one revolution on the same conveyor.

31. An apparatus according to claim 28, wherein the first and second paths are substantially circular, and wherein the first path has a first radius and the second path has a second radius different from the first radius.

32. An apparatus according to claim 31, wherein at least one tier is disk shaped, and wherein the conveyor comprises two separate food exchange ports, one located outside the outer perimeter of the disk and the other located inside the inner perimeter of the disk, and wherein the first and second paths are arranged to define a spiral travel path.

33. An apparatus according to claim 28, wherein the at least one conveyor comprises a plurality of side-by-side cooperating conveyors.

34. An apparatus according to claim 28, further comprising a heating chamber disposed in said housing so as to direct heat to at least one of the tiers, said heating chamber configured to heat the food product as it moves through said heating chamber on the at least one conveyor.

35. An apparatus according to claim 33, wherein said plurality of side-by-side cooperating conveyors are first and second conveyors configured to define a cooperating pair of conveyors, and wherein each tier further comprises a transfer junction operably associated with each pair of conveyors which directs the food product from the first conveyor to the second conveyor.

36. An apparatus according to claim 28, wherein each tier is configured with a food transfer region to move the food from one tier to the next selected tier.

37. An apparatus according to claim 35, further comprising a food transfer region which includes a drop zone extending about a portion of the second conveyor, wherein, in operation, the food product moves about a first revolution on the first conveyor and is diverted to move about a second revolution on the second conveyor in the tier and then approaches the transfer region to travel therethrough to the next underlying tier for further processing.

38. An apparatus according to claim 35, further comprising a food transfer region, wherein, in operation, the food product moves about a first revolution on the first conveyor and is diverted to move about a second revolution on the second conveyor in the tier and then approaches the transfer region to travel therethrough to the next overlying tier for further processing.

39. An apparatus according to claim 28, further comprising a food transfer region operably associated with each tier, said food transfer region configured to direct food to travel from one tier to another tier, and at least one food diversion means which helps direct the food to change travel paths on each tier.

40. An apparatus according to claim 28, further comprising a cooling chamber operably associated with at least one of said tiers.

41. An apparatus according to claim 28, wherein said inlet is configured to direct a continuous length of an elongated food product therein.

42. An apparatus according to claim 39, further comprising at least one intermediate conveyor positioned in communication with a selected portion of said at least one conveyor so as to define a minor portion of at least one of the first or second paths in said tiers.

43. An apparatus according to claim 28, wherein each tier comprises at least one cooperating pair of conveyors configured to direct a food item to travel over each of the conveyor paths defined by each of the conveyors in the conveyor pair in a respective tier before traveling to the next adjacent tier, each of said cooperating pairs being configured to direct a food product to travel serially over a first and then a second conveyor in the conveyor pair in a respective tier.

44. An apparatus according to claim 43, wherein the first conveyor in the conveyor pair is configured to direct the food product to travel greater than about 1.25 revolutions thereon before moving to the second conveyor.

45. An apparatus according to claim 43, wherein at least one of the conveyors in the conveyor pair is configured to direct the food product to travel greater than about 1.5 revolutions thereon.

46. An apparatus according to claim 43, wherein the second conveyor in the conveyor pair is configured to direct the food product to travel greater than about 1.25 revolutions thereon after moving from the first conveyor.

47. An apparatus according to claim 28, wherein each tier comprises a plurality of cooperating pairs of conveyors so as to concurrently direct multiple lines of food products through said apparatus, each of said cooperating pairs being configured to direct a food product to travel serially over a first and then a second conveyor defining the conveyor pair in a tier.

48. An apparatus according to claim 43, wherein the cooperating pair includes an innermost conveyor and an outermost conveyor, and wherein adjacent tiers are configured to alternate the travel path of the food item from the innermost conveyor to the outermost conveyor to the outermost to the innermost conveyor.

49. A large capacity vertical rise oven comprising:
 a plurality of vertically stacked tiers;
 a housing with a food inlet and outlet, said housing configured and sized to enclose at least one heater and said plurality of vertically stacked tiers therein; and
 a plurality of side-by-side cooperating conveyors operably associated with each tier, the cooperating conveyors being configured to define a predetermined food travel path over which an elongated food item is directed so as to serially travel over a major portion of each of the cooperating conveyors in each tier such that the food item travels greater than one revolution in each tier to thereby provide a food dwelling time on each tier substantially corresponding to the time it takes the food item to travel serially over the travel path defined by the cooperating conveyors.

50. A vertical rise oven according to claim 37, wherein the predetermined travel path in each tier is configured so that the food travels through greater than about 1.5 revolutions on each tier.

51. A vertical rise oven according to claim 50, wherein the travel path in each tier is substantially concentric circles.

52. A vertical rise oven according to claim 50, wherein the travel path on each tier is spiral.

53. A nested oven food processing apparatus, comprising:
 (a) an outer oven having spaced apart inner and outer walls defining an enclosure therebetween and a food inlet and food outlet, said outer oven comprising:
  a plurality of stacked tiers held within the enclosure;
  at least one conveyor operably associated with each tier, the at least one conveyor being configured to move a food item about the tier such that the food item travels greater than one revolution in each tier; and transfer means operably associated with the tiers for directing the food item to travel to the next selected tier; and (b) an inner oven defining an enclosure and having a food inlet and a food outlet, wherein said outer oven is configured to receive and surround said inner oven, wherein each of said inner and outer ovens are configured to provide separately regulated operating environments, said inner oven comprising:

a plurality of stacked tiers held within the enclosure;

at least one conveyor operably associated with each tier, the at least one conveyor being configured to move a food item about the tier such that the food item travels greater than one revolution in each tier; and transfer means operably associated with the at least one conveyor for directing the food item to travel to the next selected tier.

54. A nested oven according to claim 53, further comprising a third intermediate oven horizontally spaced a distance between said inner and outer ovens.

55. A nested oven according to claim 53, wherein said inner and outer at least one conveyors are arranged as a plurality of cooperating conveyors configured to move the food item serially over the travel path defined by each of the cooperating conveyors.

56. A nested oven according to claim 53, wherein said inner and outer ovens are annular shaped.

57. A nested oven according to claim 53, wherein said at least one conveyor of said inner and outer ovens comprises a single conveyor configured to define multiple revolutions on at least one tier.

58. A nested oven according to claim 57, wherein for at least one tier, said at least one conveyor comprises one conveyor configured to define multiple revolutions of the food travel path and another cooperating side-by-side positioned conveyor configured to define multiple revolutions of the food travel path.

59. A nested oven according to claim 53, wherein the inner and outer ovens are coaxially aligned.

60. A nested oven according to claim 53, wherein the food travels laterally between the stacked tiers of the inner oven and outer oven at at least one tier.

* * * * *